US012679127B2

(12) United States Patent
Inomata

(10) Patent No.: US 12,679,127 B2
(45) Date of Patent: Jul. 14, 2026

(54) PRINTER

(71) Applicant: TOSHIBA TEC KABUSHIKI KAISHA, Tokyo (JP)

(72) Inventor: Toshiya Inomata, Yokohama Kanagawa (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 109 days.

(21) Appl. No.: 18/642,176

(22) Filed: Apr. 22, 2024

(65) Prior Publication Data

US 2025/0100313 A1 Mar. 27, 2025

(30) Foreign Application Priority Data

Sep. 22, 2023 (JP) ................................ 2023-159053

(51) Int. Cl.

*B41J 33/00* (2006.01)
*B41J 3/407* (2006.01)
*B41J 11/04* (2006.01)
*B41J 33/16* (2006.01)
*B41J 33/40* (2006.01)

(52) U.S. Cl.

CPC .......... *B41J 33/006* (2013.01); *B41J 3/4075* (2013.01); *B41J 11/04* (2013.01); *B41J 33/16* (2013.01); *B41J 33/40* (2013.01)

(58) Field of Classification Search

CPC . B41J 33/006; B41J 33/16; B41J 33/40; B41J 3/4075; B41J 11/04; B41J 2/33; B41J 15/16; B41J 31/00; B41J 31/02; B41J 31/04; B41J 31/05; B41J 31/06; B41J 31/08; B41J 33/24; B41J 33/26;

(Continued)

(56) References Cited

U.S. PATENT DOCUMENTS 10,589,555 B2 3/2020 Matsunai
2018/0370265 A1 12/2018 Matsunai

FOREIGN PATENT DOCUMENTS

CN 115848027 A 3/2023
JP S63-059568 A 3/1988

(Continued)

OTHER PUBLICATIONS

Extended European Search Report dated Nov. 18, 2024 issued in EP Application No. 24176478.6, 9 pages.

(Continued)

*Primary Examiner* — Kristal Feggins
(74) *Attorney, Agent, or Firm* — FOLEY & LARDNER LLP

(57) ABSTRACT

A printer includes a feeding shaft, a rolling shaft, a conveyance unit, a print head, and a turning force generation mechanism. The feeding shaft rotatably holds a supply roll in which the ink ribbon is rolled. The rolling shaft rotatably holds a collection roll in which the ink ribbon fed from the supply roll is rolled. The conveyance unit conveys a printing medium along the ink ribbon that moves from the supply roll toward the collection roll. The print head prints by bringing the ink ribbon into contact with the printing medium conveyed by the conveyance unit. The turning force generation mechanism generates a turning force in a direction in which the ink ribbon is rolled around the rolling shaft during back-feeding of moving the ink ribbon in a reverse direction by rotating the feeding shaft in a direction reverse to a feeding direction of the ink ribbon.

14 Claims, 8 Drawing Sheets

(58) Field of Classification Search
CPC ... B41J 33/28; B41J 33/00; B41J 33/14; B41J 33/18; B41J 33/20; B41J 33/22
See application file for complete search history.

(56) References Cited

FOREIGN PATENT DOCUMENTS

| | | | |
|---|---|---|---|
| JP | H05-193221 | A | 8/1993 |
| JP | H11-138929 | A | 5/1999 |
| JP | 2001-030594 | A | 2/2001 |
| JP | 2004-174727 | A | 6/2004 |
| JP | 2019-005971 | A | 1/2019 |

OTHER PUBLICATIONS

Notice of Reasons for Refusal dated Dec. 2, 2025 issued in JP Application No. 2023-159053, with English translation, 8 pages.

PRINTER

CROSS-REFERENCE TO RELATED APPLICATION

This application is based upon and claims the benefit of priority from Japanese Patent Application No. 2023-159053, filed on Sep. 22, 2023, the entire contents of which are incorporated herein by reference.

FIELD

Embodiments described herein relate generally to a printer that prints on a printing medium using an ink ribbon.

BACKGROUND

A printer that prints on a printing medium using an ink ribbon includes a feeding shaft attached with a supply roll in which the ink ribbon is rolled, a print head, and a rolling shaft attached with a collection roll in which the used ink ribbon is rolled. When printing on the printing medium with the printer, the printing medium is conveyed, the ink ribbon is fed from the supply roll, the printing medium and the ink ribbon overlap and pass through the print head, and the used ink ribbon after printing is collected by the collection roll.

The ink ribbon may have slack or wrinkles due to the printing operation. When the slack or wrinkles occur in the ink ribbon, a printing failure may occur. Therefore, the printer using the ink ribbon generally includes a mechanism for eliminating the slack or wrinkles in the ink ribbon.

It is known that slack or wrinkles in an ink ribbon can be eliminated by, for example, back-feeding the ink ribbon in a reverse direction. When back-feeding the ink ribbon, a feeding shaft is rotated in a reverse direction to pull out the used ink ribbon from a collection roll.

However, when back-feeding the ink ribbon, the collection roll continues to rotate due to an inertial force after reverse rotation of the feeding shaft is stopped, which may cause new slack in the ink ribbon between the collection roll and a print head.

DETAILED DESCRIPTION

In general, according to at least one embodiment, a printer capable of preventing occurrence of slack during back-feeding of an ink ribbon is provided.

A printer according to at least one embodiment includes a feeding shaft, a rolling shaft, a conveyance unit (conveyor), a print head, and a turning force generation mechanism. The feeding shaft rotatably holds a supply roll in which the ink ribbon is rolled. The rolling shaft rotatably holds a collection roll in which the ink ribbon fed from the supply roll is rolled. The conveyance unit conveys a printing medium along the ink ribbon that moves from the supply roll toward the collection roll. The print head prints by bringing the ink ribbon into contact with the printing medium conveyed by the conveyance unit. The turning force generation mechanism generates a turning force in a direction in which the ink ribbon is rolled around the rolling shaft during back-feeding of moving the ink ribbon in a reverse direction by rotating the feeding shaft in a direction reverse to a feeding direction of the ink ribbon.

Hereinafter, at least one embodiment will be described with reference to the drawings.

Figure 1:
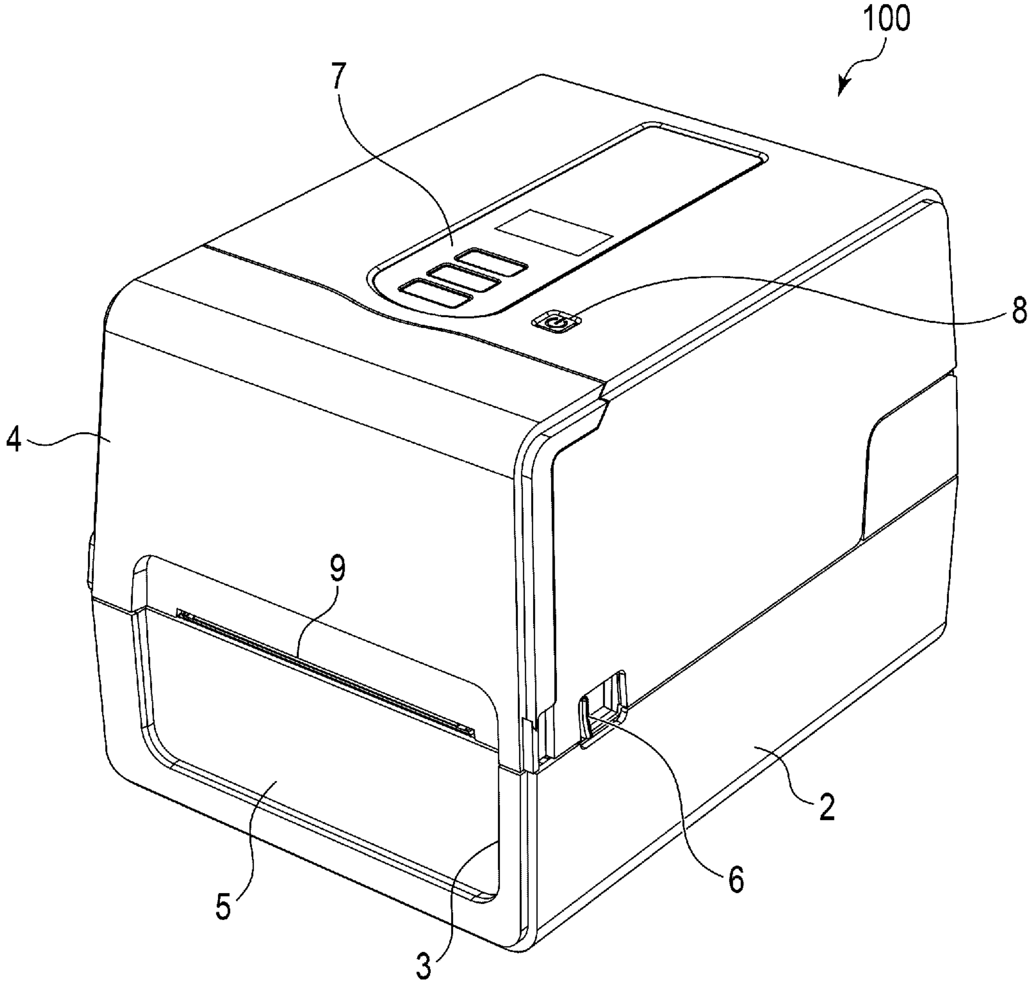
FIG. 1 is an external perspective view showing a printer according to at least one embodiment.
Figure 2:
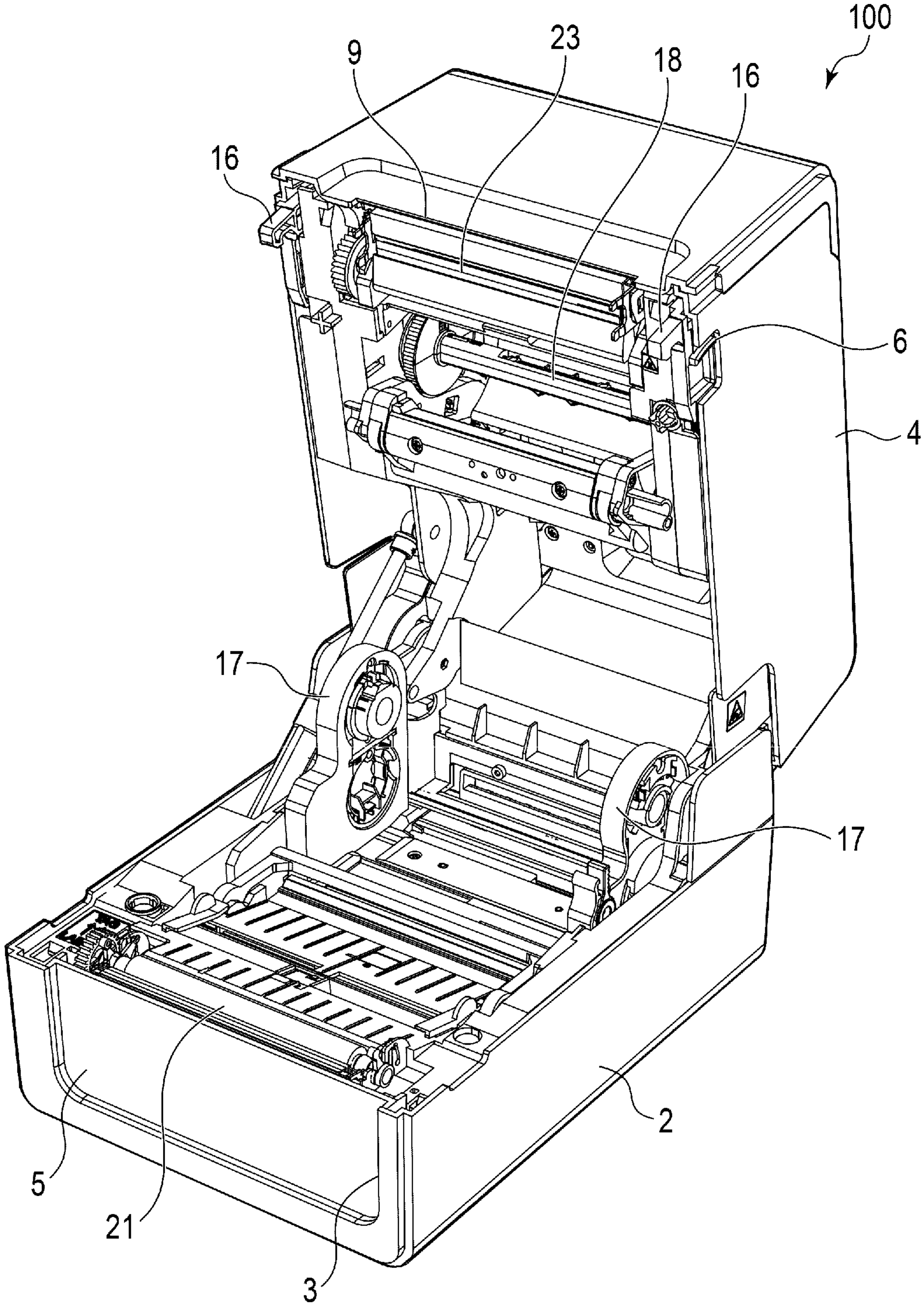
FIG. 2 is a perspective view showing a state in which a cover is opened.

As shown in FIGS. 1 and 2, a label printer 100 (hereinafter, simply referred to as a printer 100) includes a case 2 and a cover 4. The case 2 constitutes a lower casing of the printer 100, and the cover 4 constitutes an upper casing of the printer. The cover 4 is connected to the case 2 via a hinge (not shown) provided on a rear end side. The cover 4 is rotatable between a closed position shown in FIG. 1 and an open position shown in FIG. 2. In the following description, in a state shown in FIG. 1 in which the cover 4 is disposed at the closed position, a discharge port 9 side of the printer 100 is referred to as a front side, and upper, lower, left, and right directions of the printer 100 when viewed from the front side are defined.

The case 2 has a rectangular box shape with an open upper side, and has a cutout portion 3 in a front wall portion thereof for attaching a functional unit (not shown) such as a separation unit. The case 2 includes a front panel 5 attached to the cutout portion 3 when not attaching the functional unit. FIGS. 1 and 2 show a state in which the front panel 5 is attached to the cutout portion 3. The printer 100 has, between the front panel 5 and the cover 4 of the case 2, the slit-shaped discharge port 9 for discharging a printed label sheet 11.

The cover 4 has a rectangular box shape with an open lower side. Front sides of left and right side walls of the cover 4 are respectively provided with an opening lever 6 for opening the cover 4 and a fixing hook 16 that is operated by an operation of the opening lever 6. The fixing hook 16 engages with an engaged portion of the case 2 with the cover 4 disposed at the closed position, and locks the cover 4 at the closed position. An operation and display panel 7 and a power button 8 are provided on the upper wall of the cover 4.

Figure 3:
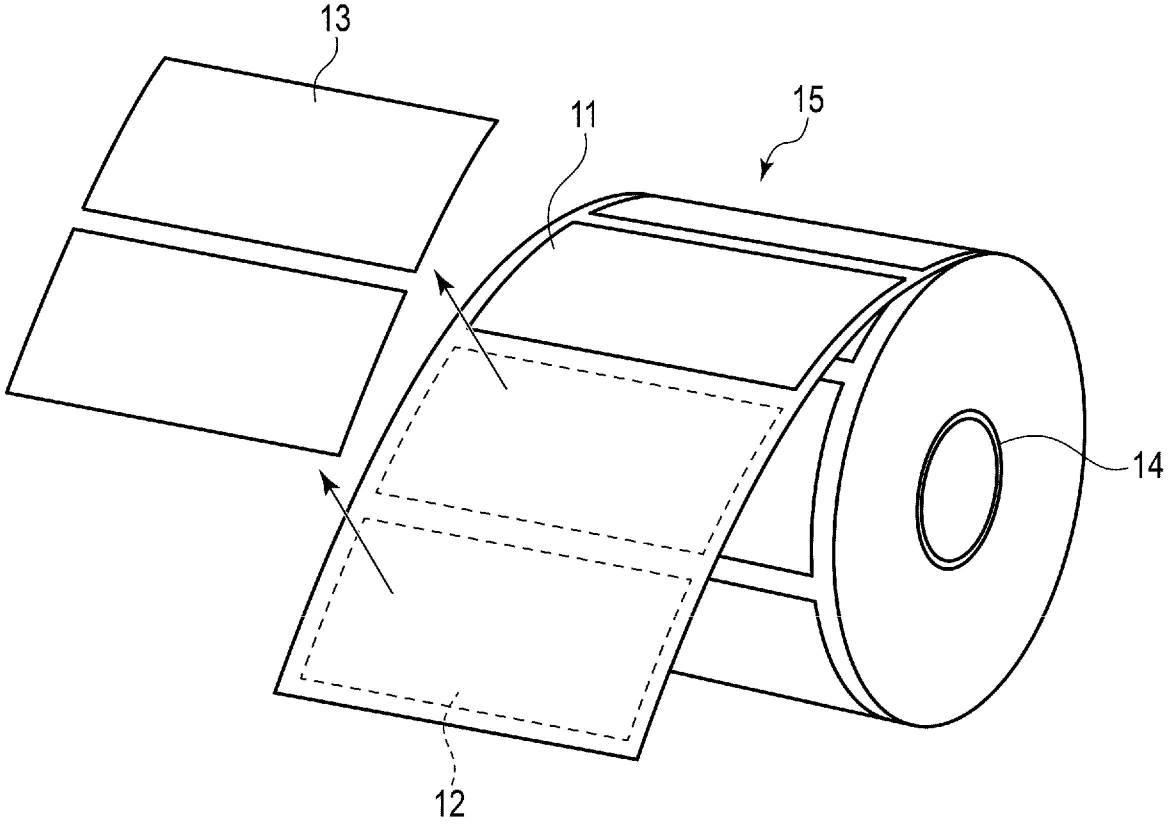
FIG. 3 is a perspective view showing a label sheet roll.

As shown in FIG. 3, the label sheet 11 to be attached in the case 2 is obtained by arranging and pasting a plurality of rectangular labels 13 at equal intervals to one surface of a long strip-shaped base sheet 12. The label 13 has an adhesive layer on a base sheet 12 side surface, is removable from the base sheet 12, and can be pasted to another article after being peeled off from the base sheet 12. A label sheet roll 15 is formed by rolling the label sheet 11 around a paper tube 14 with the surface of the base sheet 12 to which the labels 13 are pasted facing outward.

As shown in FIG. 2, the printer 100 includes a pair of left and right sheet holders 17 for attaching the label sheet roll 15. The label sheet roll 15 is attached between the pair of sheet holders 17 in an orientation shown in FIG. 3. That is, the label sheet roll 15 is attached to the printer 100 with a label 13 side surface of the label sheet 11 pulled out from the label sheet roll 15 facing upward. Therefore, when the label sheet 11 pulled out from the label sheet roll 15 is conveyed toward the discharge port 9, the label sheet roll 15 rotates counterclockwise when viewing the label sheet roll 15 from a right side. The label sheet 11 is an example of a printing medium.

Figure 4:
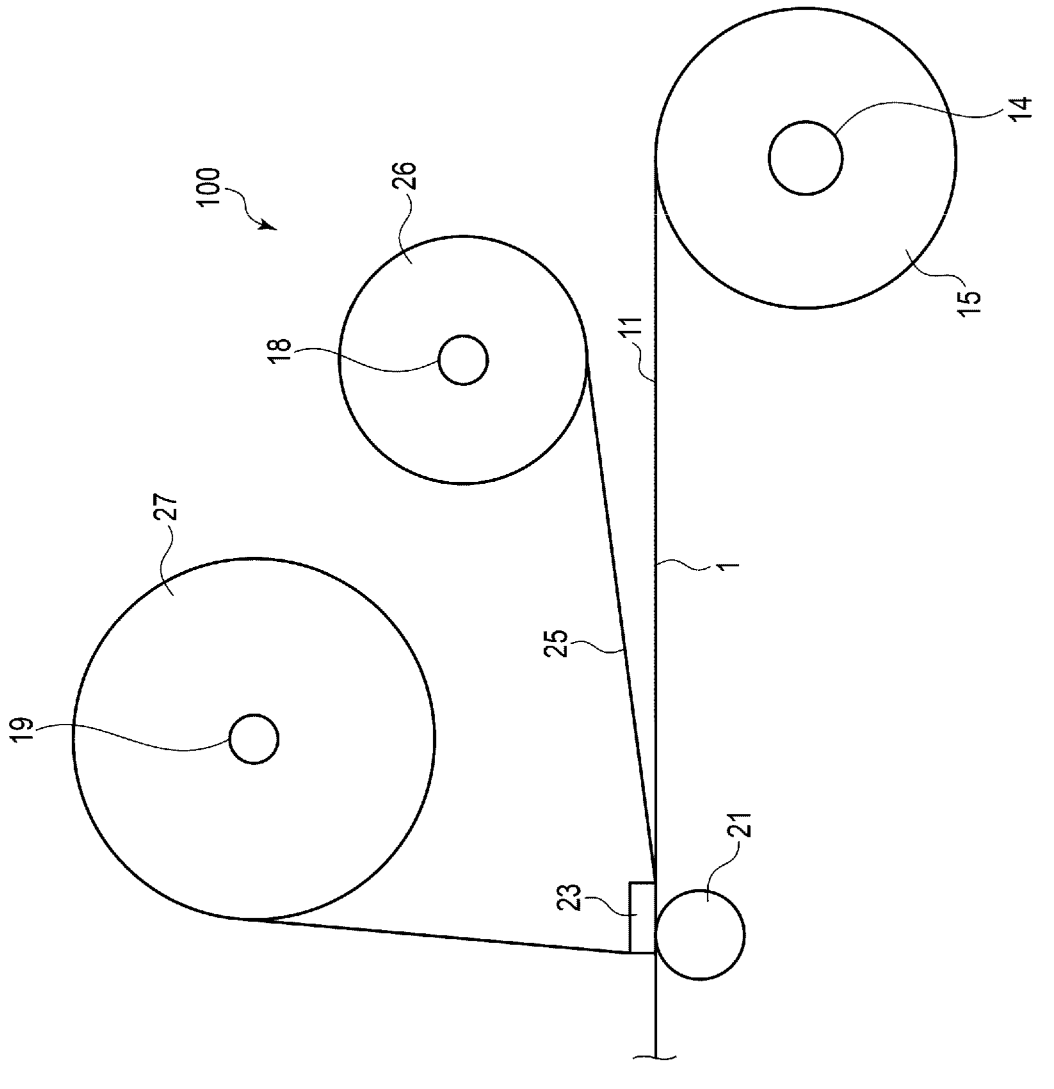
FIG. 4 is a schematic view showing an internal structure.

As shown in FIGS. 2 and 4, the printer 100 includes a platen roller 21 that applies a forward conveyance force to the label sheet 11 to pull out the label sheet 11 from the label sheet roll 15. The platen roller 21 can also rotate in a reverse direction to back-feed the label sheet 11. The platen roller 21 is disposed on a front side in the case 2 adjacent to the discharge port 9. The platen roller 21 rotates in contact with a surface of the label sheet 11 opposite to the surface where the labels 13 are pasted to the base sheet 12. The printer 100 has a conveyance path 1 for conveying the label sheet 11 pulled out from the label sheet roll 15. When the cover 4 is rotated to the open position in FIG. 2, a part of the conveyance path 1 can be opened.

The printer 100 includes a print head 23 that prints on the labels 13 of the label sheet 11 conveyed through the conveyance path 1. The print head 23 is disposed on an opposite side (upper side) of the conveyance path 1 to the platen roller 21, and is pressed against the platen roller 21. Therefore, the conveyance force can be applied from the platen roller 21 to the label sheet 11 at a position where the print head 23 is pressed against the platen roller 21. The print head 23 is configured on a cover 4 side. The cover 4 includes a pressing spring (not shown) that presses the print head 23 against the platen roller 21. The platen roller 21 is an example of the conveyance unit that conveys the printing medium.

The print head 23 can print by a heat transfer method, and can print by a thermal method. When printing by the heat transfer method, an ink ribbon 25 is interposed between the print head 23 and the label sheet 11, the ink ribbon 25 is conveyed in the same direction at the same speed as the label sheet 11, and ink of the ink ribbon 25 is melted by heat of the print head 23 to be fixed onto the labels 13.

As shown in FIG. 4, the printer 100 includes a supply roll 26 in which the long strip-shaped ink ribbon 25 is rolled around a paper tube, and a collection roll 27 in which the used ink ribbon 25 that passed through the print head 23 is rolled around a paper tube. The ink ribbon 25 stretched between the supply roll 26 and the collection roll 27 passes between the print head 23 and the platen roller 21 so as to sequentially overlap the plurality of labels 13 of the label sheet 11 conveyed through the conveyance path 1. The ink ribbon 25 holds ink to be transferred to the labels 13 of the label sheet 11 by heat.

The pair of sheet holders 17 (FIG. 2) in the case 2 rotatably hold both ends of the paper tube 14 of the label sheet roll 15. The cover 4 is provided therein with a feeding shaft 18 attached to the paper tube of the supply roll 26 of the ink ribbon 25 and a rolling shaft 19 attached to the paper tube of the collection roll 27 (not shown in FIG. 2). The feeding shaft 18 and the rolling shaft 19 are spaced apart from each other and extend in parallel.

When printing on the labels 13 of the label sheet 11, the printer 100 rotates the platen roller 21 counterclockwise in FIG. 4, and conveys the label sheet 11 pulled out from the label sheet roll 15 in a forward direction (left direction in FIG. 4) at a constant speed. At this time, the printer 100 rotates the rolling shaft 19 attached with the collection roll 27 clockwise in FIG. 4, and conveys the ink ribbon 25 in a forward direction at the same speed. In this state, the printer 100 prints on the labels 13 of the label sheet 11 via the print head 23.

When the printing operation is continued, slack or wrinkles may occur in the ink ribbon 25. It is known that such slack or wrinkles in the ink ribbon 25 can be eliminated by back-feeding the ink ribbon 25. When back-feeding the ink ribbon 25, the print head 23 is moved to a retracted position spaced upward from the platen roller 21, and the feeding shaft 18 attached with the supply roll 26 is rotated counterclockwise in a reverse direction in FIG. 4 to roll back the ink ribbon 25. Accordingly, the used ink ribbon 25 is pulled out from the collection roll 27, and the collection roll 27 rotates counterclockwise in FIG. 4.

When back-feeding of the ink ribbon 25 is ended, rotation of the feeding shaft 18 is stopped. At this time, since the collection roll 27 rotates counterclockwise in FIG. 4, the collection roll 27 continues to rotate counterclockwise due to an inertial force. In this case, new slack may occur in the ink ribbon 25 between the supply roll 26 that stops rotating and the collection roll 27 that continues to rotate. In this case, an amount of slack increases as a diameter (weight) of the collection roll 27 increases.

The printer 100 according to the at least one embodiment includes a turning force generation mechanism 30 that generates a turning force in a direction in which the ink ribbon 25 is rolled around the rolling shaft 19 of the collection roll 27 during back-feeding in order to prevent occurrence of such slack during back-feeding of the ink ribbon 25. Hereinafter, the turning force generation mechanism 30 and a peripheral structure thereof will be described with reference to FIGS. 5 to 8.

Figure 5:
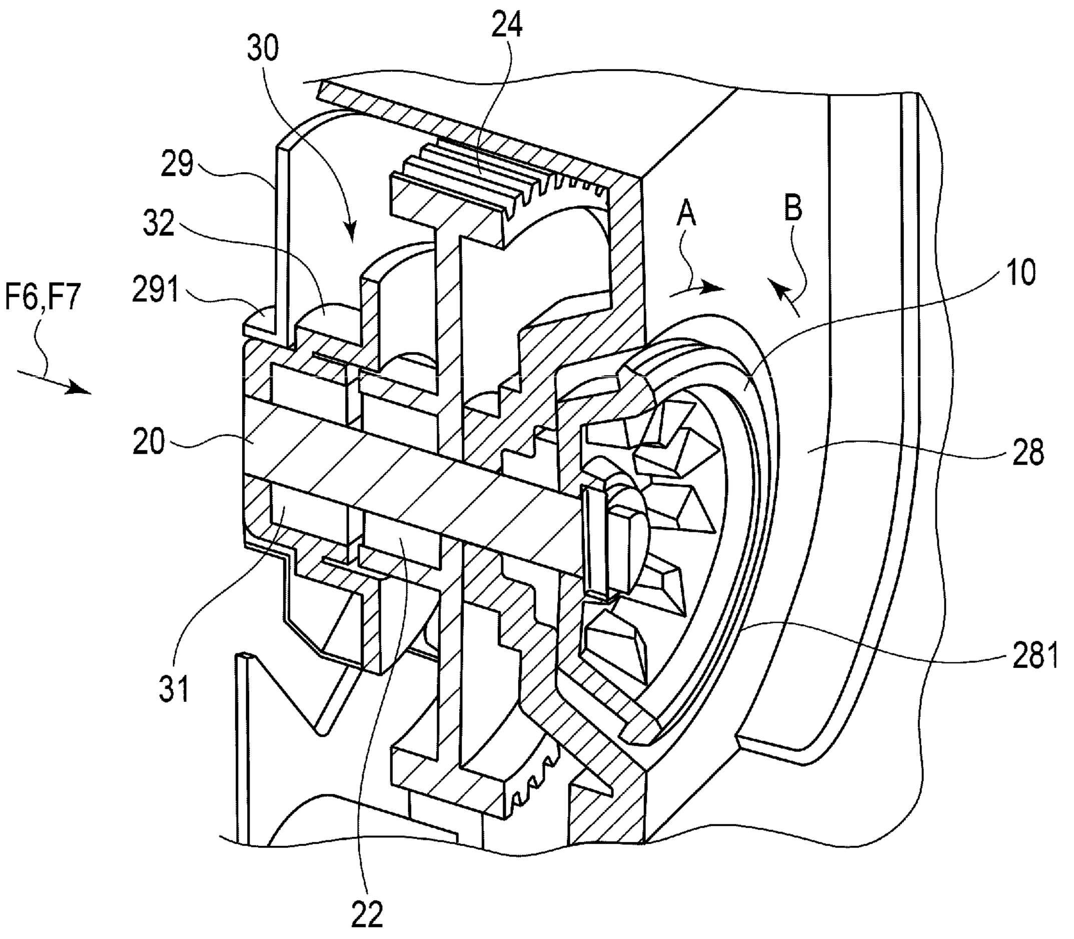
FIG. 5 is a cross-sectional perspective view showing a turning force generation mechanism connected to one end of a rolling shaft and a peripheral structure thereof.
Figure 6:
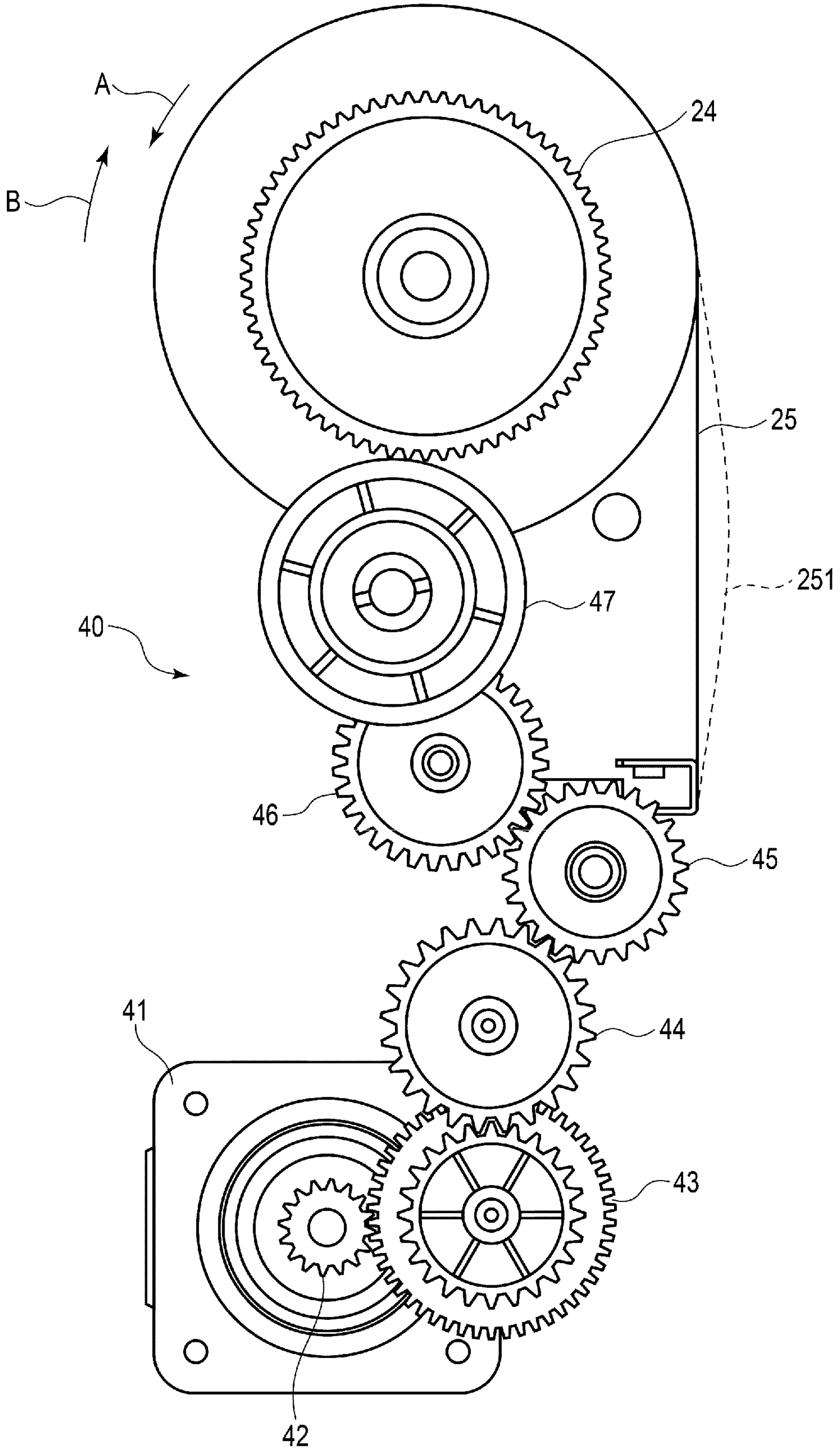
FIG. 6 is a plan view of a drive mechanism as viewed from a direction of an arrow F6.
Figure 7:
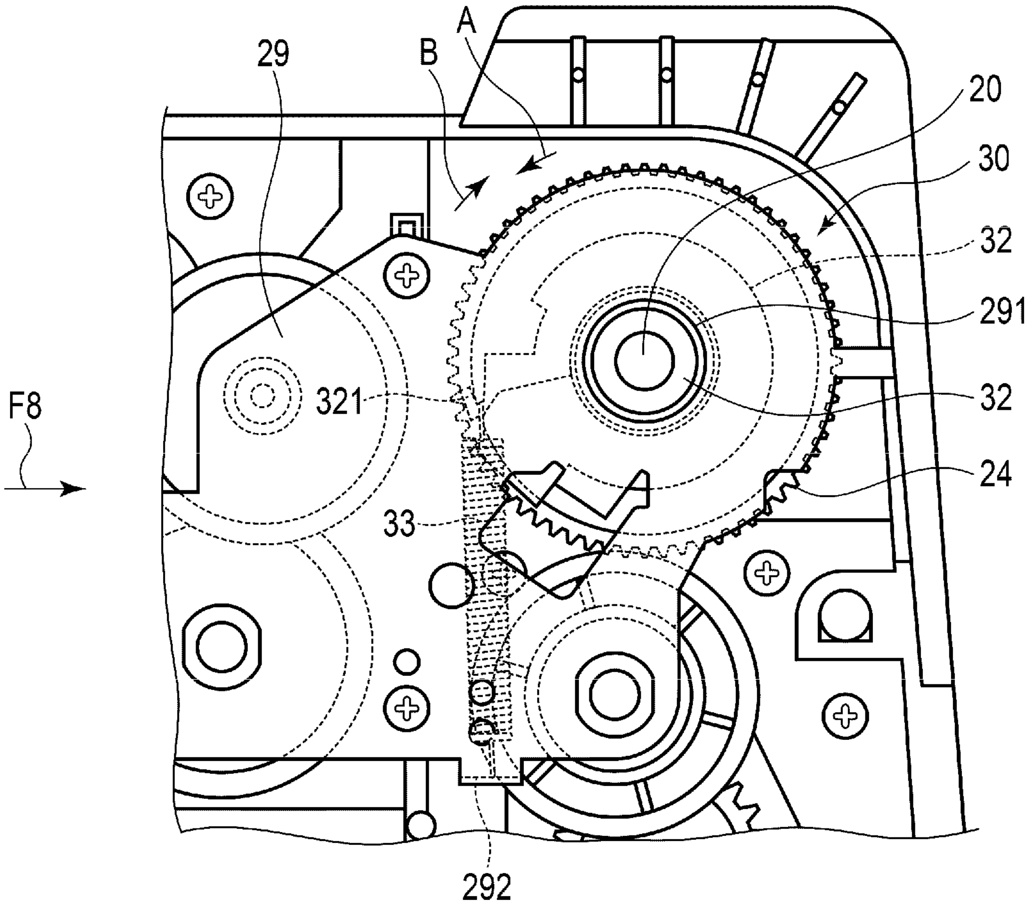
FIG. 7 is a side view of a structure in FIG. 5 as viewed from a direction of an arrow F7.
Figure 8:
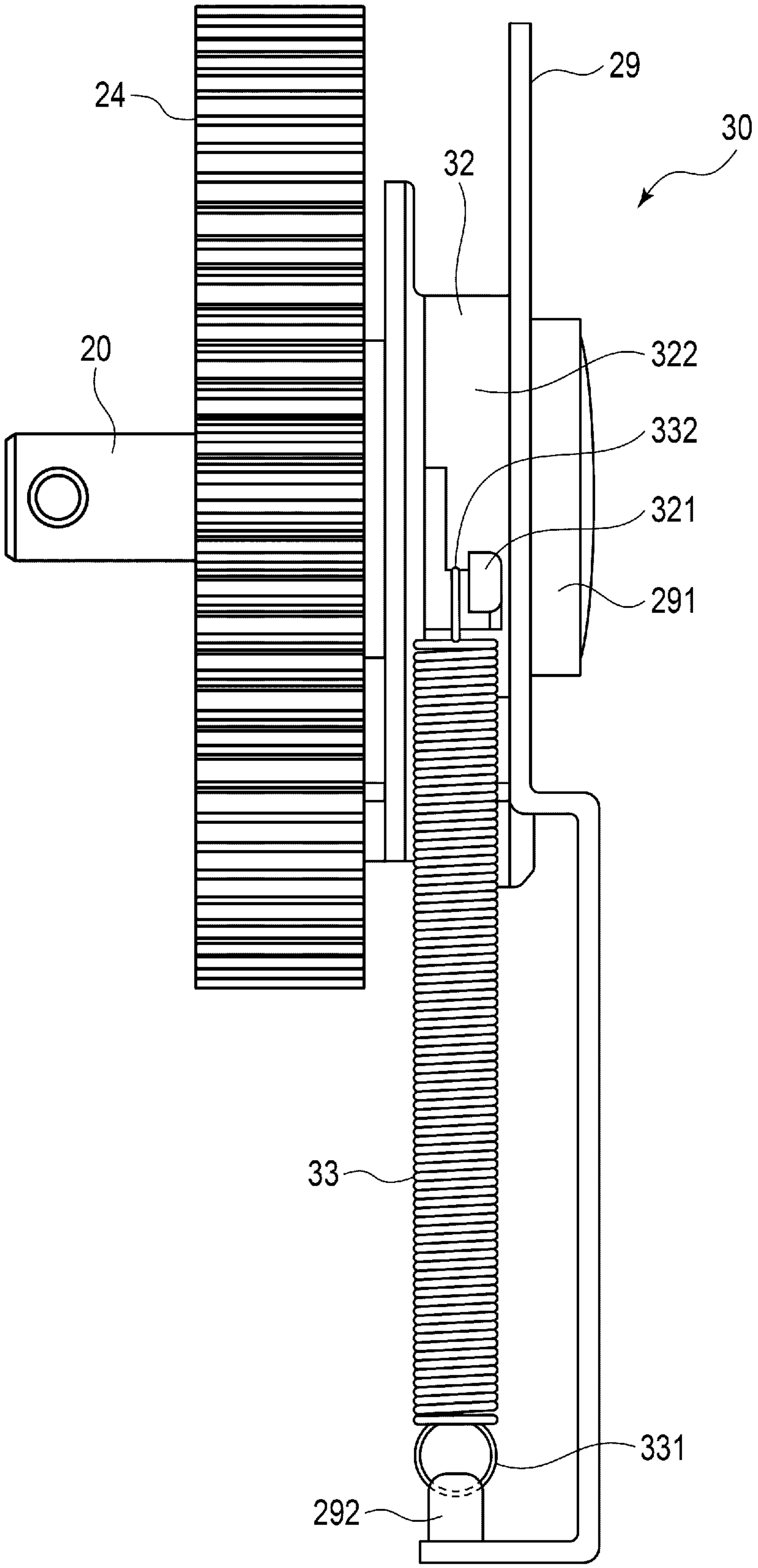
FIG. 8 is a rear view of a structure in FIG. 7 as viewed from a direction of an arrow F8.

FIG. 5 is a cross-sectional perspective view showing the turning force generation mechanism 30 and the peripheral structure thereof, FIG. 6 is a plan view of a drive mechanism 40 that drives the rolling shaft 19 of the collection roll 27 as viewed from a left side of the printer 100 (a direction of an arrow F6 in FIG. 5), FIG. 7 is a side view of the structure in FIG. 5 as viewed from a direction of an arrow F7, and FIG. 8 is a rear view of the turning force generation mechanism 30 as viewed from a direction of an arrow F8 in FIG. 7 (a rear side of the printer 100).

In order to make the description easy to understand, in each drawing, rotation directions of the feeding shaft 18 and the rolling shaft 19 and a traveling direction of the ink ribbon 25 when conveying the ink ribbon 25 in the forward direction are indicated by an arrow A, and rotation directions of the feeding shaft 18 and the rolling shaft 19 and a traveling direction of the ink ribbon 25 when back-feeding the ink ribbon 25 are indicated by an arrow B.

As shown in FIG. 5, the printer 100 includes a wheel 10 for coaxially connecting one end (left end) of the rolling shaft 19. The wheel 10 is rotatably accommodated in a recess 281 of a frame 28 fixed to the left side of the cover 4. When the collection roll 27 is attached to the printer 100, the wheel 10 receives and meshes with a bevel-shaped gear (not shown) provided at the left end of the rolling shaft 19 of the collection roll 27. Therefore, the rolling shaft 19 rotates in a direction in which the wheel 10 rotates. The wheel 10 coaxially and integrally includes a rotation shaft 20 extending through a bottom of the recess 281. That is, the rotation shaft 20 is a shaft that is coaxially and integrally connected to the rolling shaft 19.

The rotation shaft 20 extends leftward through the bottom of the recess 281 of the frame 28. A left end of the rotation shaft 20 is rotatably supported by a turning member 32 and a one-way bearing 31 to be described later, which are rotatably attached to a metal plate 29 fixed to the cover 4 at a position spaced apart on a left side of the frame 28. The metal plate 29 includes an aperture 291 having a protruding height of two to three times a plate thickness. The aperture 291 functions as a bearing that rotatably supports a left end of the turning member 32. Therefore, a bearing that rotatably supports the left end of the rotation shaft 20 can be omitted, and an axial thickness of the turning force generation mechanism 30 can be reduced.

The rotation shaft 20 has two one-way bearings 22 and 31 coaxially mounted thereon. One one-way bearing 22 close to the wheel 10 is attached between a gear 24 and the rotation shaft 20. The other one-way bearing 31 on a metal plate 29 side is a component of the turning force generation mechanism 30, and is attached between the turning member 32 of the turning force generation mechanism 30 and the rotation shaft 20. The one-way bearing 31 of the turning force generation mechanism 30 is disposed adjacent to the one-way bearing 22 on a side opposite to the wheel 10.

The one-way bearing 22 includes an inner sheath fixed to the rotation shaft 20 and an outer sheath attached to the outside of the inner sheath via a sprag. The one-way bearing 22 transmits a rotational force to the rotation shaft 20 when the gear 24 is rotated in a forward direction by the drive mechanism 40 shown in FIG. 6, and allows the rotation shaft 20 to rotate in a reverse direction with the gear 24 stopped. That is, the one-way bearing 22 functions to transmit the rotational force transmitted from a motor 41 (FIG. 6) to the rotation shaft 20 via the gear 24 when conveying the ink ribbon 25 in the forward direction, and rotate the collection roll 27 in a direction in which the ink ribbon 25 is rolled. The one-way bearing 22 functions to allow the collection roll 27 (rotation shaft 20) to rotate in the reverse direction (idle) when back-feeding the ink ribbon 25 with the motor 41 (gear 24) stopped.

The one-way bearing 31 of the turning force generation mechanism 30 includes an inner sheath fixed to the rotation shaft 20 and an outer sheath attached to the outside of the inner sheath via a sprag. The one-way bearing 31 transmits the turning force to the turning member 32 when the rotation shaft 20 is rotated in the reverse direction by back-feeding the ink ribbon 25, and allows the rotation shaft 20 to idle with respect to the turning member 32 when conveying the ink ribbon 25 in the forward direction.

As shown in FIG. 6, the drive mechanism 40 that rotates the gear 24 includes the motor 41, first to fourth gears 43 to 46 that sequentially mesh with a gear 42 fixed to a rotation shaft of the motor 41, and a fifth gear 47 with a torque limiter provided between the fourth gear 46 and the gear 24.

As shown in FIGS. 7 and 8, the turning force generation mechanism 30 includes a tension spring 33 whose lower end is fixed to the metal plate 29 and whose upper end is fixed to the turning member 32. The tension spring 33 is an example of an elastic member that is elastically deformed during back-feeding. The metal plate 29 includes a hook 292 for hooking a lower end 331 of the tension spring 33. The turning member 32 is provided with a hook 321 for hooking an upper end 332 of the tension spring 33, which protrudes from an outer peripheral surface thereof. FIGS. 7 and 8 show an initial state in which the tension spring 33 is not elastically deformed.

The turning member 32 has an annular holding groove 322 around which the stretched tension spring 33 is rolled. The hook 321 protrudes from a bottom of the holding groove 322. The metal plate 29 is disposed on a left side of the holding groove 322. The metal plate 29 functions as a retaining plate for preventing the tension spring 33 rolled around the holding groove 322 from coming off from the holding groove 322 due to a restoring force thereof.

When the rotation shaft 20 rotates clockwise in FIG. 7 during back-feeding, the turning member 32 turns clockwise in FIG. 7, and the tension spring 33 is stretched and rolled around the holding groove 322. When the tension spring 33 is stretched, the restoring force thereof acts in a direction in which the turning member 32 turns counterclockwise in FIG. 7. That is, during back-feeding of the ink ribbon 25, tension is always applied to the ink ribbon 25 between the print head 23 and the collection roll 27. In other words, when back-feeding the ink ribbon 25, a counterclockwise rotational force in FIG. 7 is applied to the rotation shaft 20, and a rotational force in a direction in which the ink ribbon 25 is rolled is applied to the rolling shaft 19.

That is, if the turning force generation mechanism 30 according to at least one embodiment is used, when rotation of the feeding shaft 18 in the reverse direction is stopped to stop rotation of the supply roll 26 at the end of the back-feeding of the ink ribbon 25, the collection roll 27 does not continue to rotate in the reverse direction due to the inertial force, and slack in the ink ribbon 25 as indicated by a broken line 251 in FIG. 6 does not occur. Therefore, according to at least one embodiment, wrinkles in the ink ribbon 25 are eliminated by back-feeding the ink ribbon 25, and no new slack occurs in the ink ribbon 25 after the back-feeding, whereby print quality can be improved.

While embodiments have been described, the embodiments have been presented by way of example and are not intended to limit the scope of the disclosure. The embodiments can be implemented in various other forms, and various omissions, substitutions, and changes can be made in a scope not departing from the gist of the exemplary embodiments. The embodiments and modifications thereof are included in the scope and the gist of the disclosure, and are included in a scope of the disclosure disclosed in the claims and equivalents thereof.

What is claimed is:

1. A printer comprising:

a feeding shaft configured to rotatably hold a supply roll in which an ink ribbon is rolled;

a rolling shaft configured to rotatably hold a collection roll in which the ink ribbon fed from the supply roll is rolled;

a conveyor configured to convey a printing medium along the ink ribbon that moves from the supply roll toward the collection roll;

a print head configured to print by bringing the ink ribbon into contact with the printing medium conveyed by the conveyor; and a turning force generation mechanism configured to generate a turning force in a direction in which the ink ribbon is rolled around the rolling shaft during back-feeding of moving the ink ribbon in a reverse direction by rotating the feeding shaft in a direction reverse to a feeding direction of the ink ribbon, the turning force generation mechanism including:

a one-way bearing including a turning member that idles when the rolling shaft rotates in a rolling direction and turns integrally with the rolling shaft during the back-feeding in which the rolling shaft rotates in a direction reverse to the rolling direction, and an elastic member elastically deformed by turning of the turning member in the reverse direction such that the elastic member turns the turning member in the rolling direction due to a restoring force of the elastic member, wherein the elastic member includes a tension spring whose one end is fixed to the turning member, and the tension spring is stretched and rolled around the turning member as the turning member turns in the reverse direction.

2. The printer according to claim 1, further comprising:

a retaining plate fixed to the turning member and the retaining plate forming a holding groove around which the tension spring is rolled while being restrained from moving together with the turning member.

3. The printer according to claim 2, wherein the other end of the tension spring is fixed to the retaining plate.

4. The printer according to claim 2, wherein retaining plate includes a metal plate.

5. The printer according to claim 1, wherein the printer is a label printer.

6. The printer according to claim 1, further comprising a driver configured to drive the rolling shaft.

7. The printer according to claim 6, wherein the driver includes a motor.

8. The printer according to claim 1, wherein the conveyor includes a platen roller.

9. The printer according to claim 1, wherein the printing medium includes a label sheet.

10. A method of operating a label printer comprising:

rotatably holding via a feeding shaft a supply roll in which an ink ribbon is rolled;

rotatably holding via a rolling shaft a collection roll in which the ink ribbon fed from the supply roll is rolled;

conveying via a conveyor a printing medium along the ink ribbon that moves from the supply roll toward the collection roll;

printing via a print head by bringing the ink ribbon into contact with the printing medium conveyed by the conveyor; and generating a turning force via a turning force generation mechanism in a direction in which the ink ribbon is rolled around the rolling shaft during back-feeding of moving the ink ribbon in a reverse direction by rotating the feeding shaft in a direction reverse to a feeding direction of the ink ribbon, the turning force generation mechanism including:

a one-way bearing including a turning member that idles when the rolling shaft rotates in a rolling direction and turns integrally with the rolling shaft during the back-feeding in which the rolling shaft rotates in a direction reverse to the rolling direction, and an elastic member elastically deformed by turning of the turning member in the reverse direction such that the elastic member turns the turning member in the rolling direction due to a restoring force of the elastic member, wherein the elastic member includes a tension spring whose one end is fixed to the turning member, and the tension spring is stretched and rolled around the turning member as the turning member turns in the reverse direction.

11. The method according to claim 10, further comprising driving, via a driver, the rolling shaft.

12. The method according to claim 11, wherein the driver includes a motor.

13. The method according to claim 10, wherein the conveyor includes a platen roller.

14. The method according to claim 10 wherein the printing medium includes a label sheet.

* * * * *